June 14, 1960          L. A. RAMER          2,941,138
MULTIPLE SPEED PERMANENT SPLIT CAPACITOR MOTOR
Filed Dec. 19, 1958          2 Sheets-Sheet 1
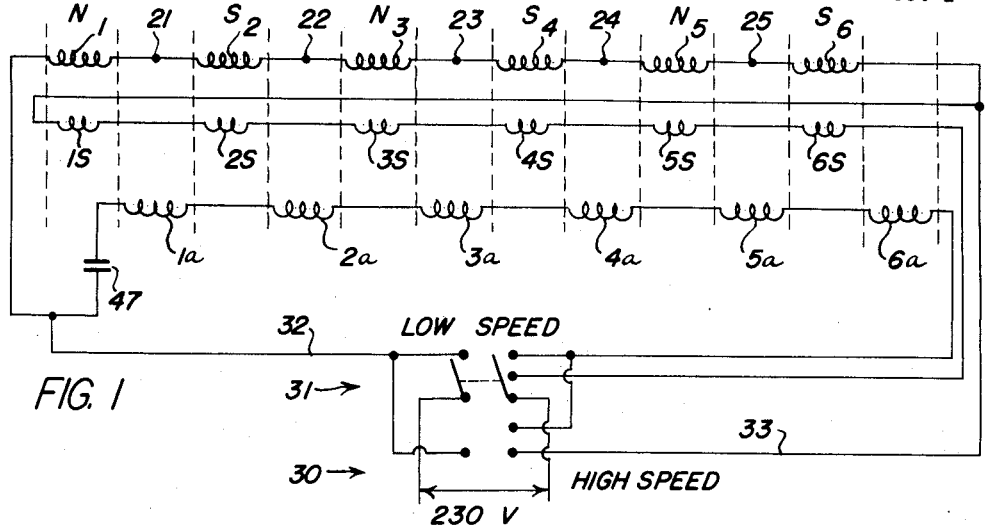
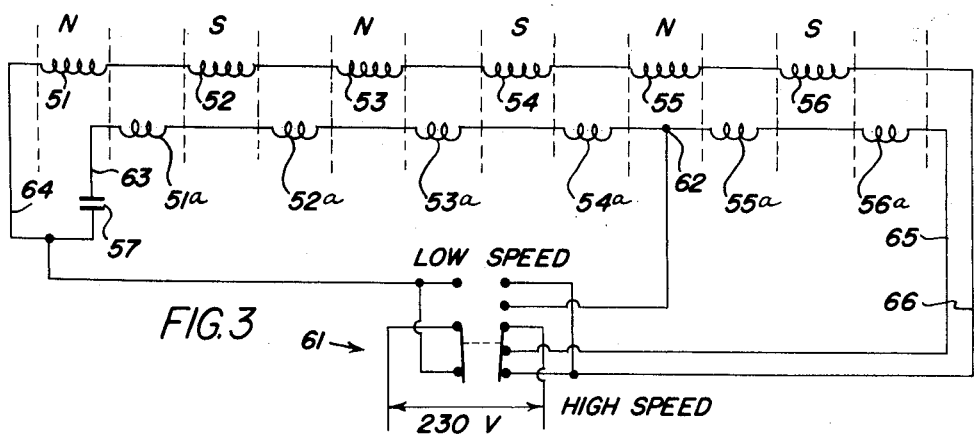
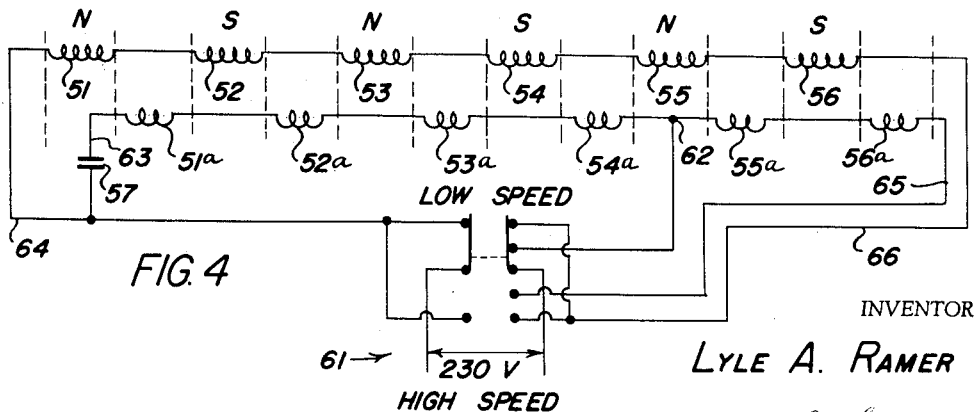
INVENTOR
LYLE A. RAMER
BY Max L. Libman
ATTORNEY June 14, 1960  L. A. RAMER  2,941,138
MULTIPLE SPEED PERMANENT SPLIT CAPACITOR MOTOR
Filed Dec. 19, 1958  2 Sheets-Sheet 2

INVENTOR
LYLE A. RAMER
BY Max L. Libman
ATTORNEY

United States Patent Office 2,941,138
Patented June 14, 1960

2,941,138
MULTIPLE SPEED PERMANENT SPLIT CAPACITOR MOTOR

Lyle A. Ramer, Elkton, Md., assignor to RMR Corporation, Elkton, Md., a corporation of Maryland Filed Dec. 19, 1958, Ser. No. 781,592

4 Claims. (Cl. 318—220)

This invention relates to motors of the permanent split capacitor type, having four, six or more poles and wound for two speeds, and particularly to fractional horsepower motors of this type.

The primary object of the invention is to produce a motor of the above character with the field windings so arranged as to eliminate the use of two windings of different potential in the same slots and thereby remove a major cause of insulation breakdown and ultimate motor failure.

A further object of the invention is to produce a motor of the above character without the use of multiple windings.

Still another object is to produce a winding for motors of the above types which enables full utilization to be made of the maximum potential capacity of standard coil winding machinery, and with a great reduction in the number of intercoil connections, which greatly increases the economy of motor production while producing a superior result, due to the reduction in labor costs of making intercoil connections.

Another object is to provide a novel method of winding standard fractional horsepower motors of the above types with less expensive winding equipment than required for present winding methods.

Two speed split capacitor motors as now made are provided with a main winding of one coil per pole, all of these coils being alike and connected in series; an auxiliary winding consisting of one further similar coil per pole, said auxiliary coils being spaced 90 electrical degrees between the poles of the main winding, and being connected in series with each other and with the usual capacitor for providing the necessary electrical phase displacement, the main and auxiliary windings being connected in parallel across the line for high speed operation. For low speed operation there is provided in addition a secondary main winding of one coil per pole, wound on the same poles respectively as the main winding, the secondary main coils being also connected in series with each other; this last winding is switched into series connection with the main winding when it is desired to operate the motor at low speed.

The objects of the present invention are achieved by eliminating the secondary main winding and providing an external tap between the last one or two coils of the auxiliary windings so that in effect one or two (or more) coils of the auxiliary winding can be cut out to produce the desired low speed operation. This not only eliminates the usual secondary main winding but also produces many other advantages in operation and economy as will be explained below.

The specific nature of the invention, as well as other objects and advantages thereof, will clearly appear from a description of a preferred embodiment, as shown in the accompanying drawings, in which:

Fig. 1 is a schematic circuit diagram of the winding of a conventional two speed permanent split phase motor, in developed form to show the relationship of the coils and pole pieces of the machine;

Fig. 3 is a diagram similar to Fig. 1, but for a machine wound according to the invention, e.g., that of Fig. 2, and connected for high speed operation; and Fig. 4 is a diagram similar to Fig. 3, but connected for low speed operation.

Figure 2:
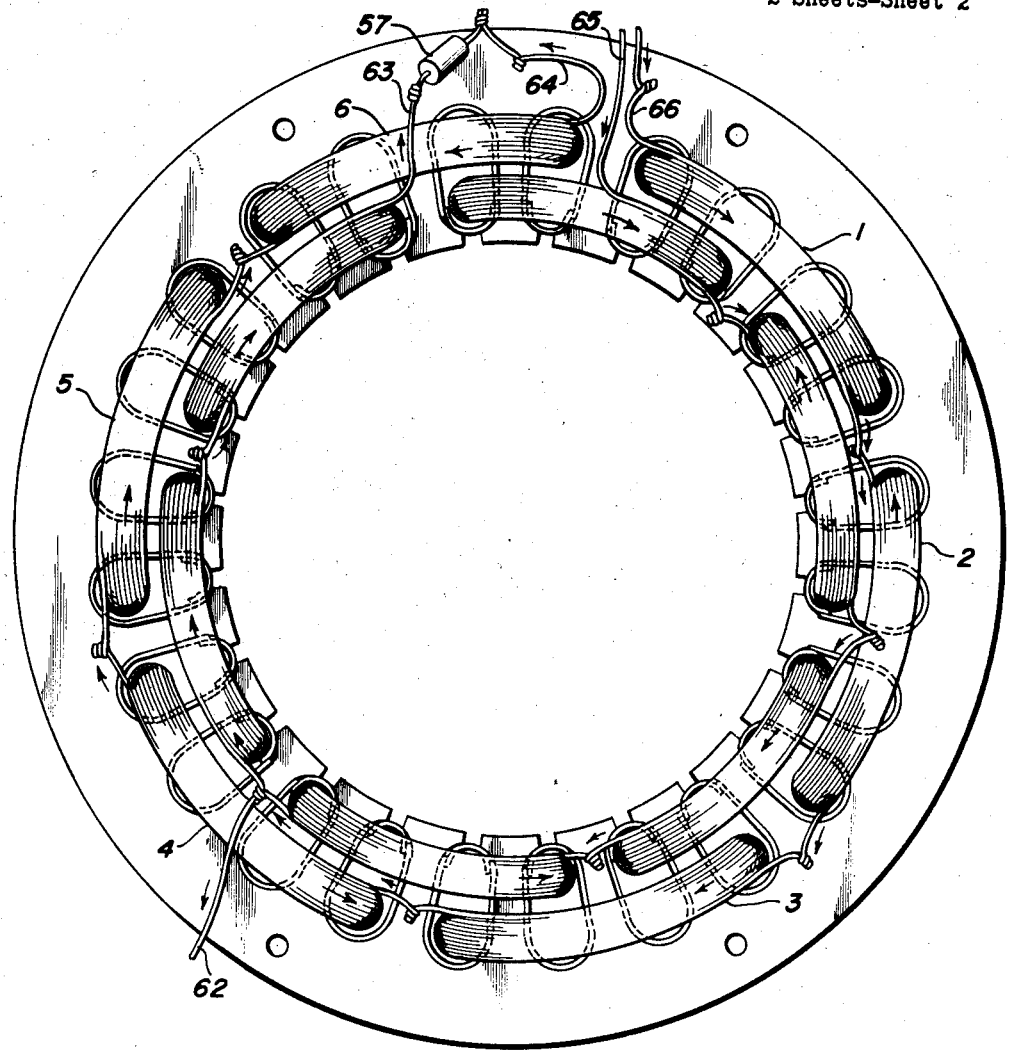
Fig. 2 is a schematic end view of the stator of a two speed permanent split phase motor wound according to the invention.

Fig. 1 shows in developed form the circuit connections for a conventional two speed permanent split capacitor motor. A six pole motor is shown by way of example, but it will be apparent that the principles will apply equally well to any other standard number of poles. The main winding coils, 1–6, are wound respectively on alternate north and south poles, and connected in series as shown at points 21, 22, . . . 25. The secondary main winding coils, 1s, . . . 6s, are wound respectively on the same poles as the corresponding main winding coils, and immediately adjacent to them. In practice, this is done by a standard coil winding machine of conventional design, as will be explained in more detail below. In order to make full use of the production facilities of the machine, the coils are wound simultaneously, which means that in the case of a six pole motor as shown, six coils will be simultaneously wound, each on a separate pole of the machine. In the case of a single speed motor, each coil is fully wound, and then all of the coils are connected in series, usually by twisting the leads of adjacent coils together and soldering or welding the tips of the twists together with a torch, after which a loose insulating sleeve, previously threaded on the wire, may be pushed up over the junction for insulation. Since the poles on which the coils are wound are of alternate polarity, but all of the coils are wound in the same direction by the simultaneous winding operation, the opposite ends of successive coils are connected together in order to maintain correct polarity. If the motor is to be a two-speed motor, which is greatly preferred for fan and air-conditioner operation, then two coils are provided on each pole as shown in Fig. 1. The standard practice in simultaneous machine winding is to first wind the coil turns simultaneously on all six poles for the high-speed winding, thus producing coils 1–6. Then the machine is halted and a large loop pulled out to provide a tap on each coil; then the machine continues to wind, immediately adjacent each high-speed coil and on the same resame respective poles, a second coil of fewer turns which serve to provide the coils 1s–6s for low-speed operation. As will be evident, there are now two coils on each pole. At this stage of the operation, the two coils (e.g., 1, 1s) are connected in series by the large loop previously mentioned, but this loop is now cut to provide two independent coils wound on each pole. All of the high-speed or main coils 1–6 are now connected in series at points 21, 22, . . . 25, and are connected to the A.-C. source 30 through any suitable switch shown as a double pole throw switch 31 and leads 32 and 33. In practice, with small fractional horsepower motors, a single pole double throw switch, generally of the rotary type, is most frequently used.

In addition to the windings previously mentioned, there is also an auxiliary winding consisting of six further coils, 1a–6a, spaced 90 electrical degrees between the poles of the main winding. The auxiliary winding is connected through the usual condenser 47 in parallel with the main winding for high-speed operation, or with the main winding and secondary main winding in series for low-speed operation. This will be apparent from the drawing, where the upper position of the switch shows the connection for low-speed operation and the lower position of the switch connects the windings for high-speed operation.

Figs. 3 and 4 show the circuit connection for operation in accordance with the invention. In this case, the secondary main winding is eliminated entirely, and only the main winding 51–56 is employed. The auxiliary winding 51a–56a is also composed of the same coils and windings as before, in series with a condenser 57, the only difference being that a tap is provided between coil 54a and coil 55a for low-speed operation. The setting of switch 61 is the same as in the previous case for switch 31, namely, the upper position shows the connections for low-speed operation, and the lower position shows the connnections for high-speed operation. It will be apparent that on low-speed operation the last two coils, namely coils 5 and 6 of the auxiliary winding have merely been removed from the circuit. In other words, for high-speed operation, all the coils of both windings are energized; but for low-speed operation, all of the main winding is energized, but only a portion of the auxiliary winding is energized. In this case, therefore, it is a reduction in the number of turns in the auxiliary winding which produces the effect of reducing the power of the motor, causing the load, usually a fan, to pull the motor down to a lower operating speed.

It is obvious that the elimination of the secondary main winding in itself results in a considerable reduction in expense, both in the operation of the machines, and more particularly in the semi-skilled labor required to connect the coils in series, since approximately a third of these connections are now eliminated. The expense of making these connections is normally a major portion of the cost of manufacturing the stator. However, in addition to this advantage, there is an even more important advantage in the improvement of operating life, particularly under adverse moisture conditions, of the motor.

With a secondary main winding made by the above described standard practice, since each secondary main coil is electrically separated from its physically adjacent main winding coil by the series of other main winding coils and secondary main coils which are electrically interposed between them. It is apparent that there will be a considerable voltage differential between the main and the secondary main coils wound on the same poles. The voltage drop across any one coil, on the high-speed connection, is only $1/N$ of the applied total voltage, where N is the number of poles, and this is the voltage between the first and last turns of the coil, which are very unlikely to come into contact; the voltage between any two adjacent turns is rather in the order of a fraction of a volt. However, the voltage between even the most favorable turns of coils 1, 1s; 2, 2s, etc., of Fig. 1 must include the voltage drops of all the intermediate coils. Since, by the machine method of winding used to maintain competitive costs, the main and secondary main coils are wound immediately adjacent each other, there is necessarily a large voltage existing between some adjacent turns on each pole. Simple calculations or measurements show that the largest such voltage exists on pole No. 1 or pole No. 2, depending on the exact method of winding, and experience shows that most insulation breakdown occurs on these poles. This results from the manner in which the commercial field of fractional horsepower motors has recently been developing.

Until recently, the great majority of multi-speed motors have been wound for 115 volts. It is apparent that the voltage between coils on a 115 volt motor would be just one-half of the voltage for 230 volts input. Since these 115 volt motors were used primarily for applications such as circulating fans, exhaust fans, space heaters, etc., where the motor was not exposed to the outside elements of rain, snow, etc., reasonably good field life was obtained.

With the increasing popularity of window air conditioners, hundreds of thousands of multi-speed motors are now being used annually to drive the evaporator and condenser fans in these units. When air conditioning first became popular, the great majority of units made were the ⅓ ton, ½ ton, and ¾ ton ratings, most of which were 115 volt units, suitable for plugging into a standard household outlet. In recent years, the trend has been toward increasing popularity of the 1 ton, 1½ ton, and 2 ton units, because of increased demand for offices, motels, hotels, and even home owners who now air condition the entire house with window units. This demand coupled with the advent of strict regulations by the Utilities and Underwriters Laboratories which limit the current draw to 12 amps on a single outlet circuit and 7.5 amps on a multiple outlet circuit for plug-in 115 volt units, has forced the air conditioning manufacturers into high volume production of 230 volt units. As a result, there are more 230 volt motors being used today than ever before, which, of course, means the use of 230 volt multi-speed air conditioner fan motors, and requires hundreds of thousands of such units per year. At such high volume of production, performance must be coupled with maximum economy to produce a competitive motor.

The conventional air conditioner, installed in a window, is obviously operating under conditions of high humidity due to the continual condensation of moisture from the atmosphere on the evaporator coils, etc. Even when the air conditioner is not in use, the motor is still subject to direct contact with water from wind driven rain and snow through the air inlet louvres in the air conditioner outer shell.

The continual high humidity condition and direct water condition reduce the insulation resistance considerably. This, coupled with the inherent high voltage between main and secondary main windings, causes an extremely high percentage of motor burn-out failures in service. This problem is one of major concern to the entire air conditioning industry to the point where many manufacturers have been forced into the manufacture of single speed units. This action has resulted in considerable consumer resistance for lack of a low speed for quietness of operation. Single speed motors have been used for years in air conditioners with excellent results for field life. This proves that a single speed motor, made with normal manufacturing care, will operate successfully under high humidity and water conditions. The difference between success and failure of an air conditioning motor thus is related to the difference between single main winding and multiple main winding of the stator.

Historically, multi-speed motors wound by the above multi-winding method have proven to be less reliable and give shorter field life than single speed motors of the same types. Motor burn-outs on multi-winding motors almost invariably are caused by insulation failure of the magnet wire at the points of high potential between windings. Examination of field returns on this type of motor over the past ten years shows conclusively that on burned out motors, the insulation failure has occurred on either No. 1 or No. 2 coil in the vast majority of cases. These two coils have the highest potential between windings, as stated above.

It will be apparent that the present invention produces essentially the same type of voltage distribution as exists in single speed motors, which have never given any significant amount of trouble from insulation breakdown. However, since the voltage across the main winding stays constant, regardless of whether the motor is running at high speed or low speed, the only way to reduce the output without changing the main winding is by intentionally lowering the efficiency, which is accomplished by removing part of the auxiliary winding. In the usual case where the main and auxiliary windings are both wound with the same number of turns per coil of the same wire size, the desired value of low speed can be attained by a combination of cutting out the necessary number of auxiliary coils and adjusting the capacitor value to obtain the necessary ratio of speeds.

It should be noted that the lowered efficiency is at the lower speed—the efficiency at the higher speed is actually slightly increased since more turns of a smaller size wire can be used because the secondary main winding is not present. However, since the current drawn at the low speed is still not appreciably in excess of the current consumption at high speed, the decrease in efficiency occurs in the operating range which can tolerate it best, namely, the low speed range and the user still pays no more for the added convenience of the low speed operation than he would pay for single speed operation at the maximum output. This type of motor is especially recommended for applications requiring low initial cost and where low speed starting and pull-up torque requirements are not unusually severe; these motors have proven eminently satisfactory for such service, from the user's point of view, while having the advantage of long life and low replacement which is essential to success from the manufacturer's viewpoint, since he must replace the defective motors.

Fig. 2 shows an end view of a partially assembled motor wound according to the invention, the circuit being the same as in Figs. 3 and 4, except that the switch is omitted. It will be understood that in practice the type of switch used is generally a rotary switch instead of the knife-blade double switch shown for simplicity in Figs. 3 and 4, but since such switches are commercially available items and not per se a part of the invention, the switch is omitted from Fig. 2. Since corresponding circuit elements are given the same reference characters in Fig. 2 as in Figs. 3 and 4, a detailed recapitulation of the circuit is unnecessary. It should be noted that the connections between adjacent series coils are alternately reversed, since all coils are wound in the same direction by machine, in order to provide the required alternate north and south poles. The instantaneous current flow is indicated by arrows.

It will be apparent that the embodiments shown are only exemplary and that various modifications can be made in construction and arrangement within the scope of the invention as defined in the appended claims.

I claim:

1. A two-speed single phase multipolar motor of the permanent split capacitor type having N poles of alternate polarity, N main field coils wound respectively in the same direction on said N poles and connected in series, an auxiliary winding circuit comprising N auxiliary coils 90 electrical degrees displaced from said main coils, and connected in series with each other and with a capacitor, unitary switching means having one operative position for simultaneously connecting said main winding in parallel with the auxiliary winding circuit across a line for high speed operation, an external tap between two of the coils of the auxiliary winding for cutting out a number of the auxiliary coils the remaining auxiliary coils being all wound in the same direction, said switching means having an alternative switching position for simultaneously by a single operation connecting said remaining auxiliary coils in series with each other and with said condenser, as a reduced auxiliary winding, in parallel with all of the main winding across the line for low speed operation.

2. The invention according to claim 1, the number of auxiliary winding coils cut out being no more than half of the total number of auxiliary coils.

3. A two-speed single phase multipolar motor of the permament split capacitor type having N poles of alternate polarity, comprising a main field winding of N similar coils all wound respectively in the same direction on said N poles and connected in series; power line terminals for connection to an external source of single phase A.-C. power; a capacitor; an auxiliary winding comprising N auxiliary coils all wound in the same direction each of the same size wire and same number of turns as the respective coils of the main winding permanently connected in series with each other and with said condenser; an external tap to the point of connection between two of said auxiliary coils for cutting out of the circuit all of the auxiliary coils beyond said tap leaving the remaining auxiliary coils in series with said condenser to constitute a low-speed auxiliary winding; and single switch means for alternatively simultaneously switching the main winding and the entire auxiliary winding in parallel across said power line terminals for high-speed operation, or simultaneously switching the main winding in parallel with said low-speed auxiliary winding across said power line terminals for low-speed operation.

4. The invention according to claim 3, the number of auxiliary coils cut out being between one and half the total number of auxiliary coils.

References Cited in the file of this patent

FOREIGN PATENTS 630,785    Germany _____ June 5, 1936